April 21, 1959 F. P. MESEROW 2,883,523

WIRELESS COMMUNICATION SYSTEM

Filed Sept. 7, 1955 3 Sheets-Sheet 1

Inventor
Francis P. Meserow
by
Mason, Kolehmainen, Rathburn and Wyss
Attorneys.

April 21, 1959 F. P. MESEROW 2,883,523
WIRELESS COMMUNICATION SYSTEM
Filed Sept. 7, 1955 3 Sheets-Sheet 2
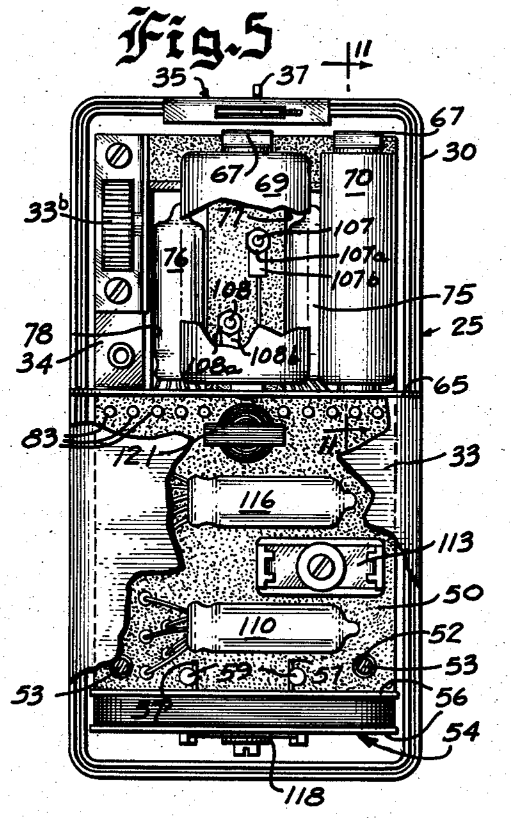
Fig. 5
Fig. 6
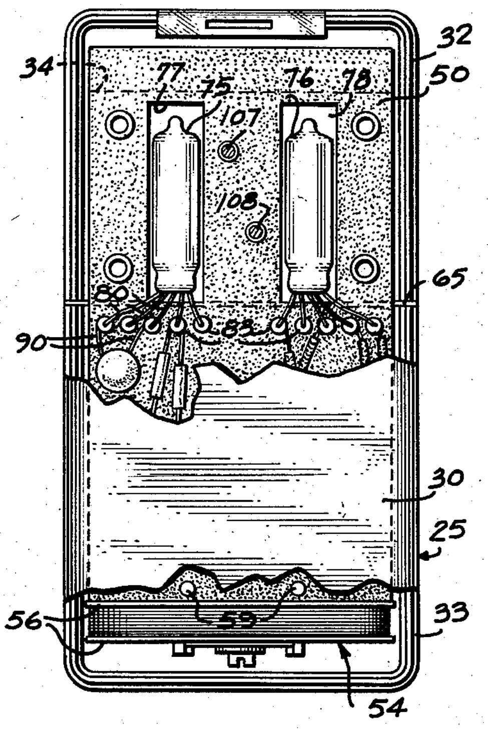
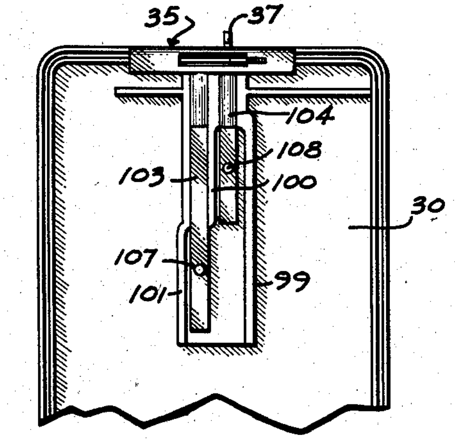
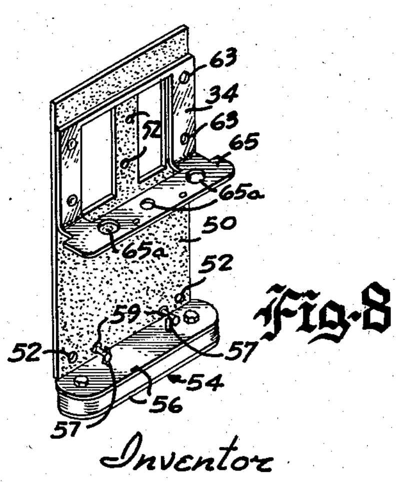
Fig. 8
Fig. 7
Inventor
Francis P. Meserow
by
Mason, Kolehmainen, Rathburn and Wyss
Attorneys.

April 21, 1959 F. P. MESEROW 2,883,523

WIRELESS COMMUNICATION SYSTEM

Filed Sept. 7, 1955 3 Sheets-Sheet 3

Inventor
Francis P. Meserow
by
Mason, Kolehmainen, Rathburn and Wyss
Attorneys.

United States Patent Office 2,883,523

Patented Apr. 21, 1959

2,883,523

WIRELESS COMMUNICATION SYSTEM

Francis P. Meserow, Chicago, Ill.

Application September 7, 1955, Serial No. 532,830

2 Claims. (Cl. 250—6)

The present invention relates to a wireless communication system, and more particularly to a wireless communication system wherein information may be transmitted to individual receiving units located within a relatively small area without the general transmission of this signal in a manner which would cause interference with other radio equipment located nearby.

For proper functioning of certain types of activities, such as, for example, hospitals, television studios, motion picture studios, etc. it is important and usually necessary that means be provided for enabling direct and immediate communication between a central operation station and a number of individuals operating within a certain limited area. In the case of a hospital, this area may be relatively large as compared to a television studio in which the area is generally a single studio set, and consequently, has an area usually of the order of a few hundred square feet. In the past, such communication has been achieved by means of loud-speaker or public address systems in those locations where transmission of the information to everyone in the area is not undesirable and by means of head sets and connecting cord systems in which cables extend from the persons to be contacted to one or more jacks located in the area where the individual signals must be transmitted. The public address systems are generally employed in hospitals to page the physicians and other personnel, and the head sets and connecting cable systems are more commonly used in television and motion picture studios for cueing or otherwise contacting various ones of the technicians, directors, prop men, etc. Loud-speaker systems when used in hospitals suffer from the inherent disadvantage that unless an exceptionally large number of speaker units are disposed throughout the hospital, the sound level from each loud-speaker must be relatively high thereby causing inconvenience to the patients and others. Since in many instances it is important that the speakers not be located in the patients' rooms where sound therefrom would be particularly annoying, when the person to be contacted happens to be in one of these rooms, the message must be relayed to him by other personnel or he must leave the particular room and go to the location of one of the loud-speakers. Such a procedure is, of course, undesirable and it would be desirable if means were provided whereby each of the persons who might be contacted could carry a small receiver which would provide him with information sent from the central station. Similarly, the use of head sets and the trailing cord system when used in motion picture and television studios suffers from the fact that the persons wearing the head sets do not have the freedom of movement sometimes necessary, and furthermore, the actors and actresses taking part in the presentation being given cannot be prompted or cued by such means because of the unsightly appearance of the head phones and associated cord. Therefore, it would be desirable in such cases to provide means for enabling direct and individual communication to each of the technical personnel as well as to those taking part in the actual performance thereby eliminating such things as hand signals, bulky cards, etc.

In order to make such wireless communication systems practical, it would be further desirable if the signal transmitted from the central station to the various interested persons be confined to a given area such that these signals would not be of sufficient strength in the outlying areas to cause interference with conventional radio equipment, in which case licenses and other control procedure required by the Federal Communications Commission would be obviated. In order to make such a system practical, it is necessary that each of the receiver units to be carried by the various persons to be contacted be relatively small in size and light in weight so that they may be worn on the garments of the user without any undue interference with his normal activities. In addition, such a receiver should be small so that when a performer in a televised or filmed performance wears the unit it would not be visible. To this end, the loud-speaker used by the performers may be a hearing-aid type of speaker cosmetically disguised so as to be invisible to the audience.

Therefore, one object of the present invention is to provide a new and improved wireless communication system enabling the transfer of information from a central station to a plurality of self-contained mobile receiving stations located within a given area.

Another object of the present invention is to provide a new and improved radio receiver for use in this wireless communication system.

Still another object of the present invention is to provide a new and improved wireless communication system wherein reproducible signals are provided within a given area while the area outside of this given area is not provided with signals of reproducible strength.

A further object of the present invention is to provide a new and improved receiver which is small in size, compact in design, reliable in operation and convenient in use.

Further objects and advantages and a better understanding of the present invention may be had from a reading of the following detailed description with reference to the accompanying drawings, in which:

Fig. 5 is a front elevational view of the receiver of Figs. 2 and 3 with a portion of the case broken away to show the internal portions thereof;

Fig. 6 is a rear elevational view of the receiver of Figs. 2 and 3 with a portion of the case broken away to show the internal portions thereof;

Fig. 7 is a fragmentary view of the upper portion of the rear segment of the receiver case;

Fig. 8 is an isometric view of a circuit support panel showing the receiving antenna mounted thereon;

Figures 1, 2, 3, 4:
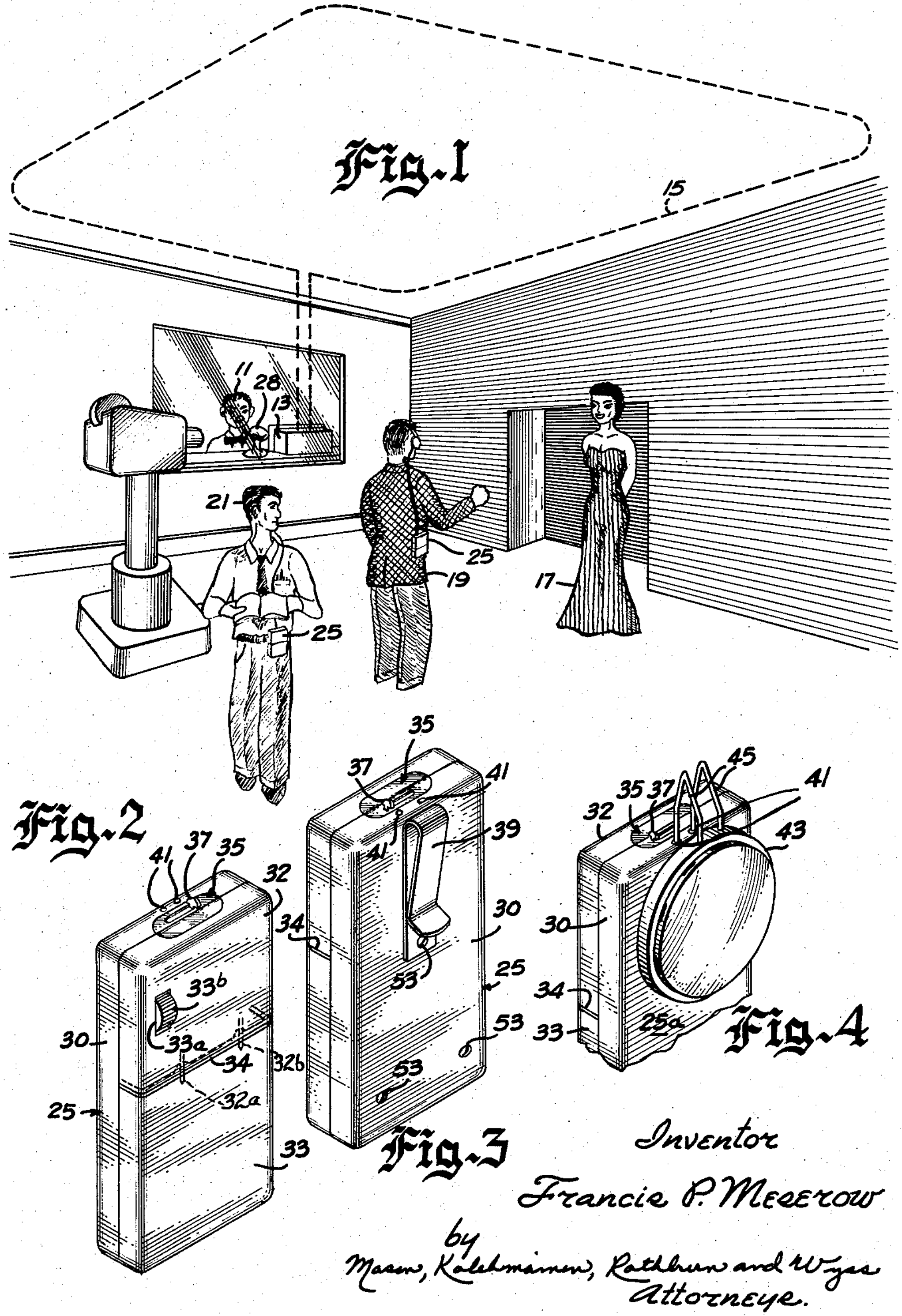
Fig. 1 is a perspective view of a television studio incorporating the wireless communication system of the present invention.
Fig. 2 is an isometric view looking toward the top front of a receiver embodying the present invention.
Fig. 3 is an isometric view of the device of Fig. 2 looking toward the top rear thereof.
Fig. 4 is a fragmentary isometric view of an alternative embodiment of the receiver of Figs. 2 and 3 wherein the loud-speaker is used as a clip for attaching the receiver to a supporting object.

Briefly, the present invention comprises a closed transmission system wherein an audio modulated radio frequency wave is impressed upon a loop antenna, which surrounds the area within which the audio intelligence from the central transmitting station connected to the antenna is desired to be received. In view of the fact that the electromagnetic waves radiated from the antenna are super-imposed in an in-phase relationship within the area enclosed by the antenna, a relatively high signal strength may be maintained within that area in spite of the fact that the signal on the antenna is of a relatively low energy level. Inasmuch as the signal on the antenna may be relatively weak, the electromagnetic waves which are radiated outside of the area enclosed by the antenna are also very weak and, therefore, of insufficient strength to cause appreciable interference with any radio equipment located even a short distance away from the antenna. For this reason, it is unnecessary to obtain FCC approval to operate the equipment or to use frequencies designated by the FCC.

The transmitter, which is used in the system of the present invention, is standard in all respects, producing an audio modulated wave at a fixed carrier frequency preferably around 100 kilocycles. Since, however, it is desirable that each of the persons likely to be called within the area enclosed by the antenna loop be provided with a receiver which they may carry on their person, the types of radio receivers commonly available on the market are inadequate for use with this system, and therefore, a special type receiver is provided. Furthermore, in order to minimize the necessary signal strength on the antenna, it is important that each of the receivers must be accurately tuned to the carrier frequency of the antenna signal.

The receivers to be used with this system are relatively small being rectangular in construction and having outside dimensions of approximately 5 x 2½ x ¾ inches and including in one embodiment a combined on-off switch and volume control potentiometer and a simple resilient belt clip for attaching the receiver to wearing apparel, and in another embodiment including a mercury type on-off switch and no volume control, the receiver being turned off only when the receiver is in a horizontal position. This latter embodiment includes a combined loudspeaker and clip which is attached to the receiver and resiliently urged against the back of the case thereof for securing the receiver to the wearing apparel of the user.

In order to minimize the physical size of each of the receivers, substantially all of the space within the cavity in the case is occupied by necessary circuit elements, and in addition, various improved terminal and mounting structures are provided to enable the compact location of the electrical components on a separate support panel. Moreover, the case is constructed in three parts, one part being easily and quickly removable so as to expose the battery support portion of the case whereby replacement of the batteries is facilitated.

Referring now to the drawings and particularly to Fig. 1 wherein is shown a television studio in which a person 11 such as, for example, a director, is located in a control station at a transmitter 13 which is connected to supply an audio modulated signal to an antenna loop 15. The loop 15 may suitably consist of a single loop of copper wire which surrounds the area in which a number of persons such as, for example, a performer 17, a set manager 19, and a prop man 21 are located. It will be understood by those skilled in the art that the loop of the antenna 15 need not actually surround the area to which communication is to take place but may enclose an area somewhat above or below it as is, for example, shown in Fig. 1 of the drawings. While the radiated signal strength will be greatest in the plane of the loop, it is sufficiently strong ten to twenty feet below the loop to enable satisfactory signal reproduction without employing an antenna signal of sufficient strength to require licensing by the Federal Communications Commission. Therefore, it will be understood that when the area enclosed by the antenna 15 is referred to hereinafter in the specification and claims, any portion or portions of the space actually enclosed or effectively enclosed by the antenna 15 is intended.

Each of the persons located within the area enclosed by the antenna 15 are provided with individual, self-contained radio receivers 25 which are accurately tuned to the carrier frequency of the signal transmitted by the transmitter 13 and thus radiated by the antenna 15. Although the performer 17 also carries such a receiver, it is not visible in the drawings since it is hidden in her garments and her loud-speaker is of the hearing-aid type cosmetically disguised so that the television audience will be oblivious to the fact that she is being cued by the director 11. As previously pointed out, the modulated electromagnetic waves which are radiated by the antenna 15 combine within the area enclosed thereby to effect a signal of reproducible strength in the area occupied by the various persons 17, 19 and 21, whereas, the signal outside of the arear enclosed by the antenna 15 is so weak as to have only a negligible effect on radio equipment located a reasonable distance way from it. If desired, the transmitter 13 may be provided with two audio inputs, one from a microphone 28 located in the control room and another (not visible in drawings) from the program line. In addition, it has been found desirable to provide a transmitter 13 which may be operated on a selected one of two carrier frequencies so that if desired two such systems may be simultaneously operated in a single area, certain ones of the receivers in that area being tuned to the carrier frequency of one of the signals and the other receivers in the area being tuned to the carrier frequency of another of the signals. The same antenna may be used to radiate both electromagnetic waves or individual antennae may be provided if desired.

Referring now to Figs. 2 and 3 wherein is shown, respectively, front and rear isometric views of a radio receiver suitable for use with the system of the present invention illustrated in Fig. 1. This receiver, which is generally designated by the numeral 25, includes a rectangular case which comprises a rear member 30 having a rectangular cavity therein opening onto similar cavities in each of a pair of front members 32 and 33, which are likewise rectangular in shape and have rectangularly shaped cavities therein. In the case of the members 32 and 33, however, the centrally extending end thereof is open and abuts against a portion of a metallic bracket 34 which, in addition to providing an attractive and ornamental divider for the front of the case separates the battery housing portion of the receiver 25 from the remainder thereof, the batteries being located in the upper portion which is covered by the member 32. A spring loaded clip 35 having a slidable knob 37 thereon is provided for coaction with a pair of downwardly extending pins 32*a* and 32*b* on the member 32 which are received in suitable apertures in the bracket 34 for removably securing the battery cover member 32 to the remainder of the case. As best shown in Fig. 2, a combination on-off switch and volume control knob 33*b* extends outwardly through an elongated slot 33*a* in the case member 32.

In order to provide a mounting device for facilitating the supporting of the receiver 25 from the garments of the user, a resilient spring clip 39 is secured to the rear portion 30 of the case near the upper end thereof. It will be understood that the use of the clip 39 is not necessary since the receiver 25 is sufficiently small in physical size that it may be placed in a pocket or other receptacle on the wearer. However, a convenient place for wearing such a receiver is on the belt, and therefore, the clip 39 is provided. A pair of apertures 41 are provided at the upper end of the rear case member 30 to facilitate the insertion of prongs from a connector element to a jack in the receiver 25 whereby audio signals from the output stage of the receiver may be coupled to a speaker in the form of a head set or a hearing-aid type transducer.

In accordance with another aspect of the present invention illustrated in connection with a receiver **25*a* shown in Fig. 4, the clip 39 may be replaced with a disk shaped loud-speaker 43 secured to the rearward cover case portion 30 by means of a pair of bent-over resilient conductor rods 45 which in addition to coupling the audio signals from the receiver 25 to the loud-speaker 43 serve to resiliently bias the rear face of the speaker unit 43 against the rear face of the case member 30, whereby the loud-speaker itself serves as a clip to facilitate attachment of the receiver 25*a*** to the garments of the user.

Referring now to Figs. 5, 6 and 8, there is shown the subassembly of the receiver 25 in which the electrical components are assembled on a supporting panel 50 to provide an assembly unit which may be readily arranged within the cavity in the rearward member 30 and secured thereto, prior to the time the forward case members 32 and 33 are assembled. Consequently, the panel 50 is rectangular, substantially conforming to the cross-sectional shape of the cavity within the rear cover member 30, and is provided with a plurality of apertures 52 for the accommodation of headed mounting screws 53 which extend into the case through suitable apertures provided in the rear case member 30. As best shown in Fig. 3, one of these screws 53 may also be used to secure the clip 39 to the member 30. A receiving antenna 54, which consists of a random wound coil disposed between a pair of elongated insulating support plates 56, is secured to the lower end of the panel 50 by means of a pair of spaced terminal members 57 which extend upwardly from the upper insulating plate 56 and are electrically connected to the ends of the coil 54 and secured, as by soldering, to a pair of terminal members 59 which are mounted on the panel 52 in suitable apertures provided therein. It has been found in accordance with the present invention that the use of a random wound antenna 54 enables the provision, in an economical manner, of a large number of turns in a small space. Moreover, since the radiated wave from the transmitting antenna 15 is horizontally polarized, the plane of the receiving antenna 54 is so positioned in the case of the receiver 25 that during normal use thereof it lies in a horizontal plane. In this way, the operating efficiency of the over-all system is improved.

In accordance with another aspect of the present invention, the L-shaped conductor bracket 34 is secured to the upper portion of the panel 50 as by the plurality of rivets 63 with the lower portion 65 thereof extending substantially perpendicularly from the panel 50. In this manner, the extending portion 65 of the bracket 34 provides the case separating and ornamental member which is interposed between the case portions 32 and 33, provides one set of battery engaging terminals and also provides one wall of the battery housing section of the receiver 25, whereby when the upper front cover member 32 is removed for the replacement of batteries, the majority of the electrical components of the receiver 25 which may suitably be provided on the back of the panel 50 or in the space between the extension 65 on the bracket 34 and the antenna 54 are not exposed. Therefore, damage to the circuits of the receiver during replacement of the batteries by untrained personnel is prevented.

As best shown in Fig. 5, a pair of leaf-spring type battery connector terminals 67 are secured near the upper end of the panel 50 as by riveting and are adapted to engage the upper terminals of a pair of batteries 69 and 70 positioned within the battery housing portion of the receiver thereby to coact with the bracket 34 both to support the batteries in the receiver case and to electrically connect the batteries in the receiver circuit for proper energization thereof. As best shown in Fig. 5, the battery 69, which provides the relatively high B+ voltage, is disposed between the intermediate portion of the bracket extension 65 and the central clip 67, and the battery 70, which supplies the cathode heating current and is smaller in physical size than the battery 69, is positioned toward the side of the case. In order to insure good contact between the cylindrical terminals of the batteries 69 and 70 with the bracket 34, a plurality of apertures **65*a* are provided in the bracket extension 65** for the reception of these battery terminals.

In order to reduce local radio interference within the receiver, the audio frequency operating discharge devices 75 and 76 are mounted respectively within elongated rectangular apertures 77 and 78 provided in the panel 50 behind the battery housing portion of the receiver case. Since the tubes 75 and 76 are relatively small and thin, a 1AG1 and a CK526AX being employed in the audio stages of the receiver, even though these tubes are located directly behind the batteries, the overall thickness of the case of the receiver 25 is approximately three-quarters of one inch. The manner in which the discharge devices 75 and 76 are positioned in relation to the battery 69 is best shown in Fig. 11 where it will be seen that there is little unoccupied space in the cavity of the receiver case.

Since electron discharge devices of the above-mentioned type are provided with flexible leads designated in the drawing as 80, replacement of such tubes presents more of a problem than does replacement of the larger type discharge devices which have rigid prongs which merely snap in and out of a connector type socket. In the case of the smaller tubes, used in the receiver of the present invention, it is necessary that the leads be soldered to the terminal connectors, and therefore, in order to facilitate the connection of these terminals within the receiver so that replacement of tubes may be achieved with a minimum of time and expense, an eyelet type of connector member 83 is provided. Each connector 83 has the usual end flanges 84 and 85 and is additionally provided with an intermediate flange 86 which coacts with the flange 85 to surround portions of the support panel 50 adjacent to apertures 88 suitably provided in the panel 50 securely to mount the connectors 83. As is best shown in Fig. 10, there is thus provided a partially enclosed space around the connector 83 located intermediate the outer flange 84 and the intermediate flange 86 so that the leads 90 from other circuit elements which must be connected to the leads 80 of the idscharge devices may be coiled about the terminal 83 in this area and soldered thereto. The leads 80 from the discharge devices are inserted into the cylindrical aperture in the terminal member 83 and also soldered thereto. Therefore, in order to remove one of the discharge devices from the receiver for replacement or testing thereof, it is merely necessary to cause a heated element such as, for example, a soldering iron, to engage each of the terminal members 83 associated with the terminal leads 80 of the discharge device being removed and then to withdraw the respective leads 80 therefrom. In this manner the joint between the connector 83 and one or more of the other leads 90 connected thereto is not disturbed.

As discussed above, receivers for use in hospitals may be provided with a gravity actuated switch such as a mercury type on-off switch. In a reciver **25*a* of this type in which a mercury switch is provided in place of the manually controlled on-off switch, the mercury switch may be secured to the lower side of the bracket portion 65, and therefore, additional space is available in the battery housing section of the case. This space may be utilized to advantage for accommodating an additional A battery whereby the receiver 25** may be operated for longer periods of time without the replacement of batteries. Since it has been found that the type receiver utilizing a mercury switch is best suited for hospitals and since in the case of hospital use the receivers are normally maintained in an energized condition for considerably longer periods of time than in the case of the receivers used in connection with a television studio, for example, the provision of an additional A battery in such receivers is desirable.

Figure 9:
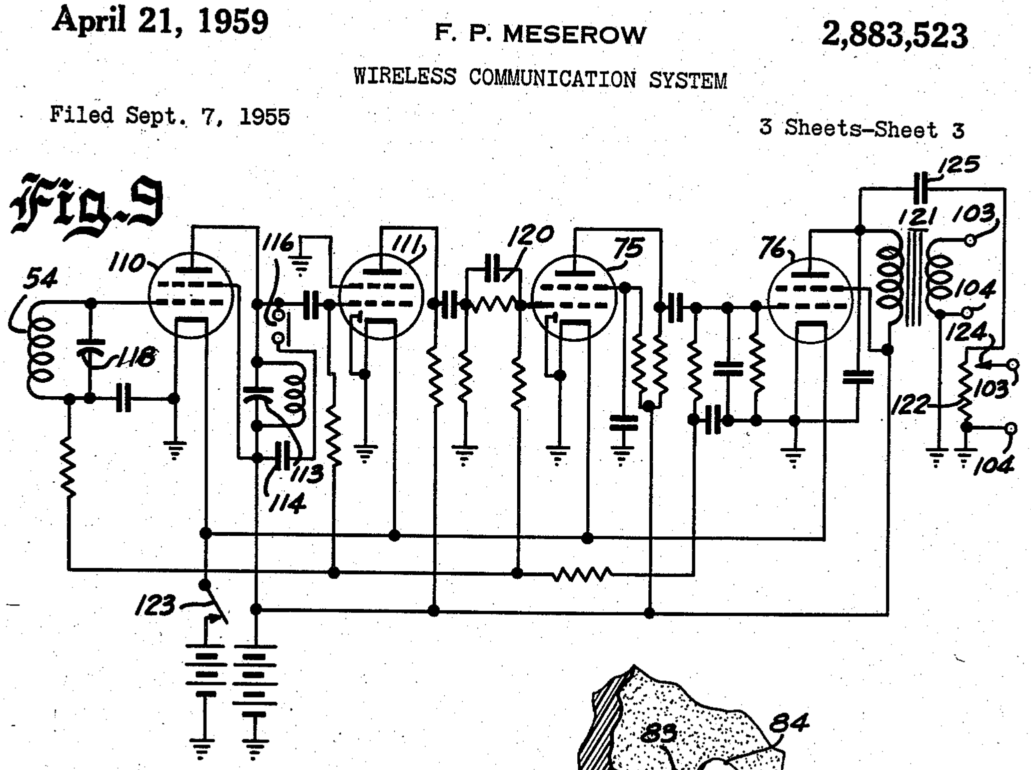
Fig. 9 is a schematic diagram of the electric circuit of the receiver embodying the present invention.
Figures 10, 11, 12:
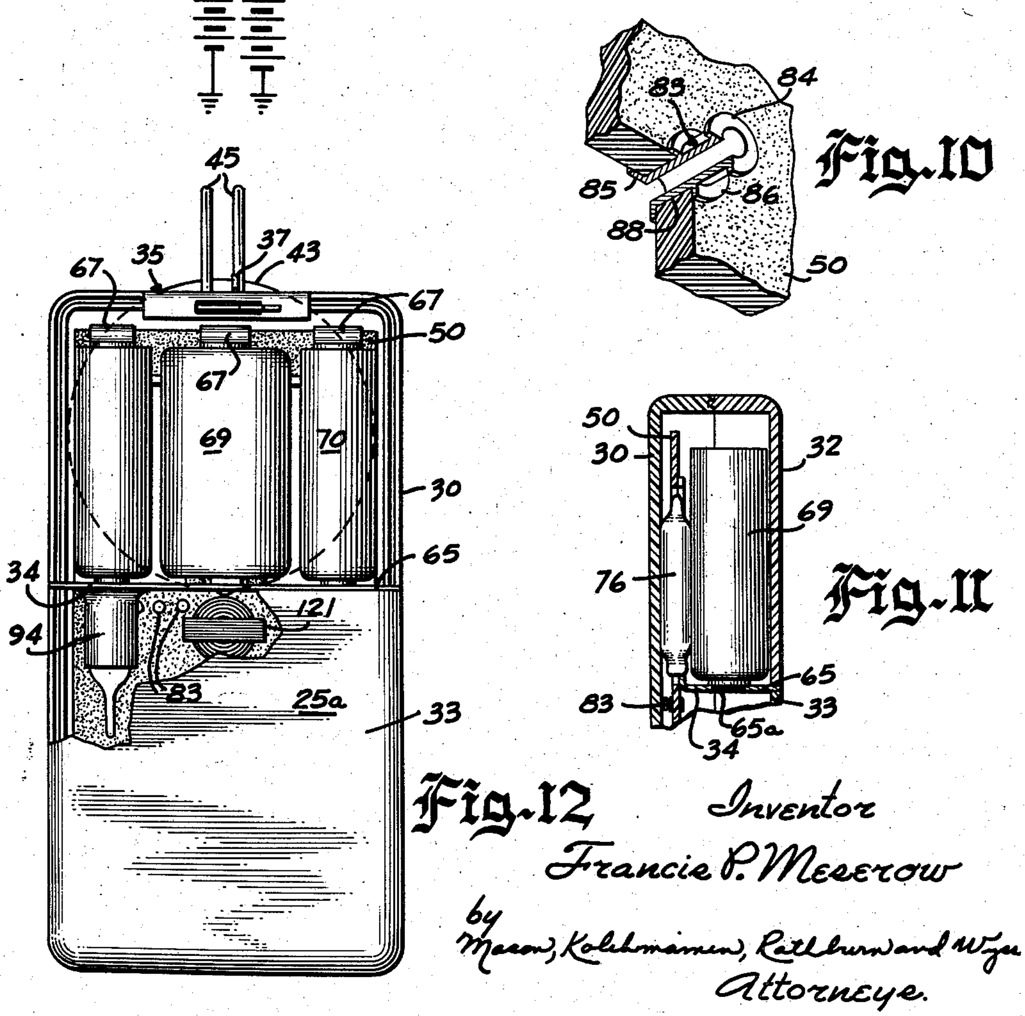
Fig. 10 is a fragmentary isometric view of a connector used for electrically connecting two or more electric components together and for supporting such members from the support panel.
Fig. 11 is a fragmentary, partially sectioned end view of the receiver embodying the present invention.
Fig. 12 is a front elevational view of the receiver of Fig. 4 shown with a portion of the case broken away to show the internal portions thereof.

A receiver of the type particularly suited for hospital use is designated as **25*a* in the drawings and as shown in Fig. 12, a gravity actuated switch such as mercury type switch 94 is secured as by soldering to the lower side of the transverse portion 65 of the bracket 34 thereby to ground one terminal of the switch. The remaining terminal of the switch is connected in the manner to be described in detail hereinafter in connection with Fig. 9 to the remaining portions of the circuit so that when the receiver 25 is in an upright position with the switch elements in the switch 94 thus connected by the liquid mercury contained therein, the receiver circuit is energized from the batteries, whereas, when the receiver 25 is in a lying-down position with the contacts in the switch 94** disconnected by virtue of the liquid mercury flowing away therefrom, the receiver circuit is deenergized.

In order to facilitate connection of the terminals of a suitable transducer to the receiving circuit, the rear case member 30 is provided near the upper end thereof with a plurality of inwardly extending ribs 99, 100 and 101 between respective ones of which are mounted conductive bars 103 and 104 which are aligned with and partially inserted in the apertures 41 in the upper end of the cover member 30. The bars 103 and 104 are provided with cylindrical bores into which are inserted the rods of the connecting member in the case of the receiver **25*a* or a connecting plug (not shown) in the case of the receiver 25 and, it may be desirable to slit the upper ends of each of these bars 103 and 104 so as to provide a resilient portion thereon for insuring a good electric and physical connection between the bars 103 and 104 and the connector member. Since the bars 103 and 104 support the loud-speaker 43 in the receiver 25*a* (see Fig. 4), they are relatively heavy, suitably being machined from brass stock, and are secured to the case member 30 by means of a pair of threaded studs 107 and 108 which are affixed to and extend inwardly from the bars 103 and 104 for reception in suitable apertures in the panel 50 and are locked thereto by threaded nuts 107*a* and 108*a* respectively. Terminal members 107*b* and 108*b* may be provided to facilitate connection of the bars 103 and 104** to the receiver circuit.

Referring now to Fig. 9 wherein is shown an electric circuit diagram of the receiver 25 of the present invention, it will be seen that this circuit is substantially conventional in that it includes a pair of cascade coupled RF amplifiers 110 and 111. The anode circuit of the amplifier 110 being tuned by means of the RF tank circuit 113 to the carrier frequency of the waves radiated by the antenna 15. In order to enable the use of the same receiver irrespective of which of the two operating frequencies at which the transmitter is operated, a capacitor 114 is serially connected with a single throw double pole switch 116 across the tank circuit 113 which tunes the anode circuit of the RF amplifier 110 so that when the capacitor 114 is switched into the anode circuit of the device 110 the receiver is tuned to receive one frequency and when the capacitor 114 is switched out of the anode circuit by means of the switch 116 the receiver 25 is tuned to receive another frequency. The receiving antenna 54 is shunted by an adjustable trimmer condenser 118 to insure that the antenna 54 is accurately tuned to the carrier frequency of the transmitted wave. The output signal from the second RF amplifying stage 111 is coupled through a conventional RC coupling circuit and a high frequency compensation circuit 120, which includes a resistor and a capacitor connected in parallel, to the control grid of a tetrode discharge 75. Grid detection takes place in the device 75 and an audio signal appears at the anode thereof which is coupled in a conventional manner to the audio power output amplifier 76 for the development of a signal in the anode circuit thereof which is of sufficient amplitude to drive a loudspeaker or earphones.

The audio output amplifier 76 is provided with two selectable outputs so that the same circuit may be used whether the receiver is of the type 25 or the type **25*a*. One output appears across the secondary winding of an output transformer 121 the primary winding of which is connected in the anode circuit of the amplifier 76. The second output is taken off the load resistor 122 which has a variable tap 124 thereon preferably adjustable by knob 33 which also controls the on-off switch 123 of the receiver 25. When the circuit of Fig. 9 is used with the receiver 25 which includes the on-off knob 33*b*, the resistor 122 and associated capacitor 125 are omitted from the circuit, the secondary winding of the transformer 121 being connected to the terminals 103 and 104. When the circuit of Fig. 9 is used in a receiver 25*a*, which has a mercury on-off switch and no volume control, the variable tap 124 is connected to the terminal bus bar 103 and the bar 104 is grounded. However, although the transformer 121** remains in the circuit, the secondary winding is open-circuited.

While the invention has been described by a particular embodiment thereof, it will be understood by those skilled in the art that many changes and modifications may be made without departing from the invention. Therefore, in the appended claims it is intended to cover all such changes and modifications as fall within the true spirit and scope of the invention.

What is claimed as new and desired to be secured by Letters Patent of the United States is:

1. A wireless communication system comprising transmitter means including an antenna for radiating polarized electromagnetic waves and a portable receiver for receiving said waves, said receiver including a case suitable for disposition in the pocket of clothing, an electrical circuit means including a transducer and supported by said case for converting said waves into sound waves, a polarized antenna electrically connected to said circuit means and supported by said case, said antenna being oriented relative to said case to efficiently receive said polarized electromagnetic waves when said case is in a vertical position, and gravity actuated switch means supported by said case for selectively energizing said circuit means only when said case is in a vertical position and said receiving antenna is disposed for efficient reception of said polarized waves.

2. In a wireless communication system of the type embodying an antenna for radiating polarized electromagnetic waves, a portable receiver for receiving said waves, said receiver comprising a case suitable for disposition in the pocket of clothing, an electrical circuit means including a transducer and supported by said case for converting said waves into sound waves, a polarized antenna electrically connected to said circuit means and supported by said case, said antenna being oriented relative to said case to efficiently receive said polarized electromagnetic waves when said case is in a vertical position, and gravity actuated switch means supported by said case for selectively energizing said circuit means only when said case is in a vertical position and said receiving antenna is disposed for efficient reception of said polarized waves.

(References on following page)

References Cited in the file of this patent

UNITED STATES PATENTS

| | | |
|---|---|---|
| 1,754,880 | Clement | Apr. 15, 1930 |
| 2,140,655 | Sloan | Dec. 20, 1938 |
| 2,311,435 | Gerhard | Feb. 16, 1943 |
| 2,357,439 | Usselman | Sept. 5, 1944 |
| 2,475,641 | Rosenberg | July 12, 1949 |
| 2,487,601 | Schnoor et al. | Nov. 8, 1949 |
| 2,490,563 | Van Gastle | Dec. 6, 1949 |
| 2,500,301 | Tresise et al. | Mar. 14, 1950 |
| 2,508,918 | Hines | May 23, 1950 |
| 2,521,423 | Stuck | Sept. 5, 1950 |
| 2,585,191 | Tresise et al. | Feb. 12, 1952 |
| 2,591,438 | Kinman et al. | Apr. 1, 1952 |
| 2,593,479 | Nieter | Apr. 22, 1952 |
| 2,630,526 | Zelov | Mar. 13, 1953 |
| 2,641,704 | Stott | June 9, 1953 |
| 2,662,975 | Schwarz | Dec. 15, 1953 |
| 2,775,652 | Stutz | Dec. 25, 1956 |

FOREIGN PATENTS

| | | |
|---|---|---|
| 414,560 | Great Britain | Aug. 9, 1934 |